May 24, 1932.　　　C. H. HART　　　1,859,363
SAW SETTING MACHINE
Filed Jan. 30, 1931　　　2 Sheets-Sheet 2
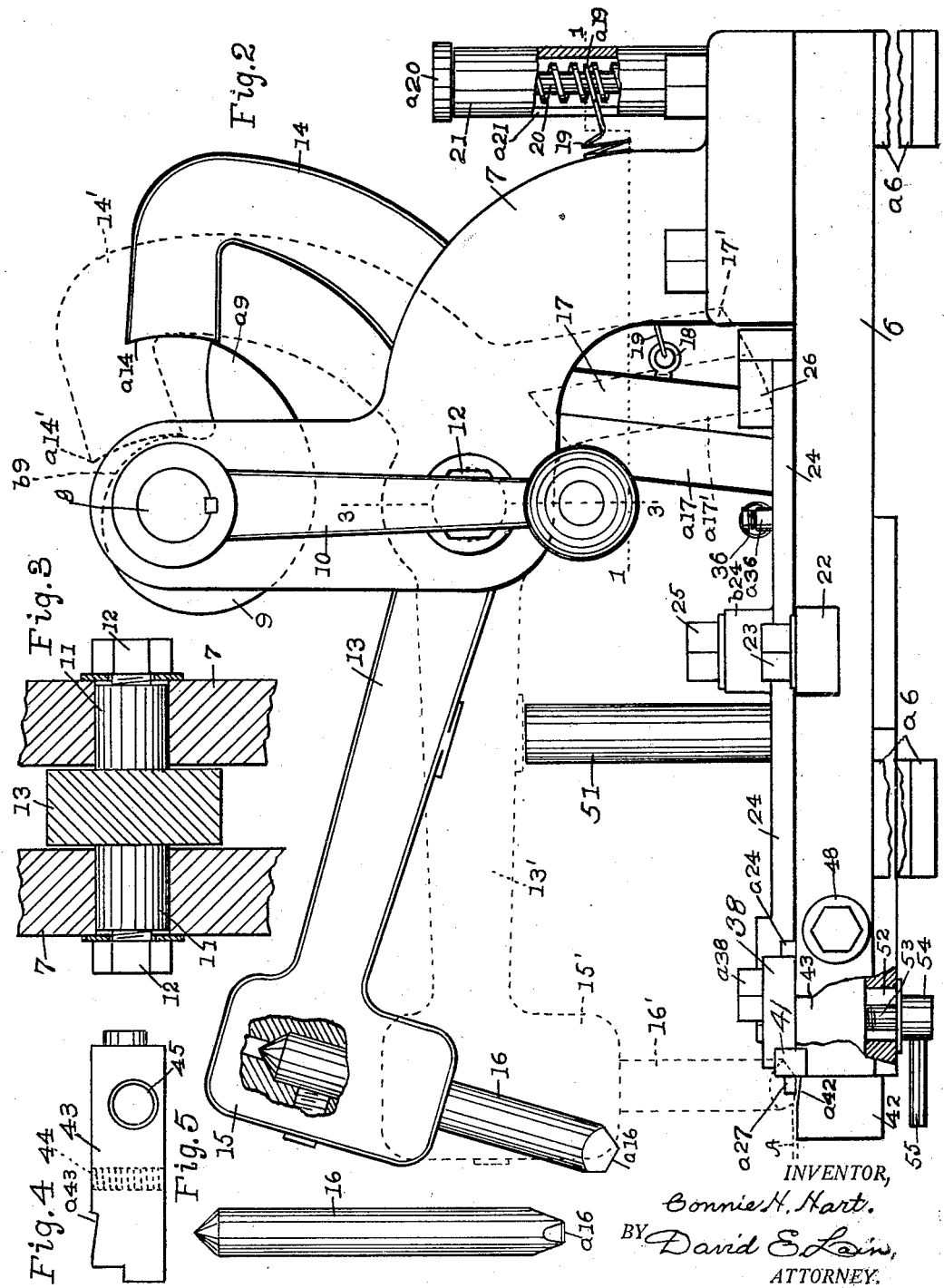

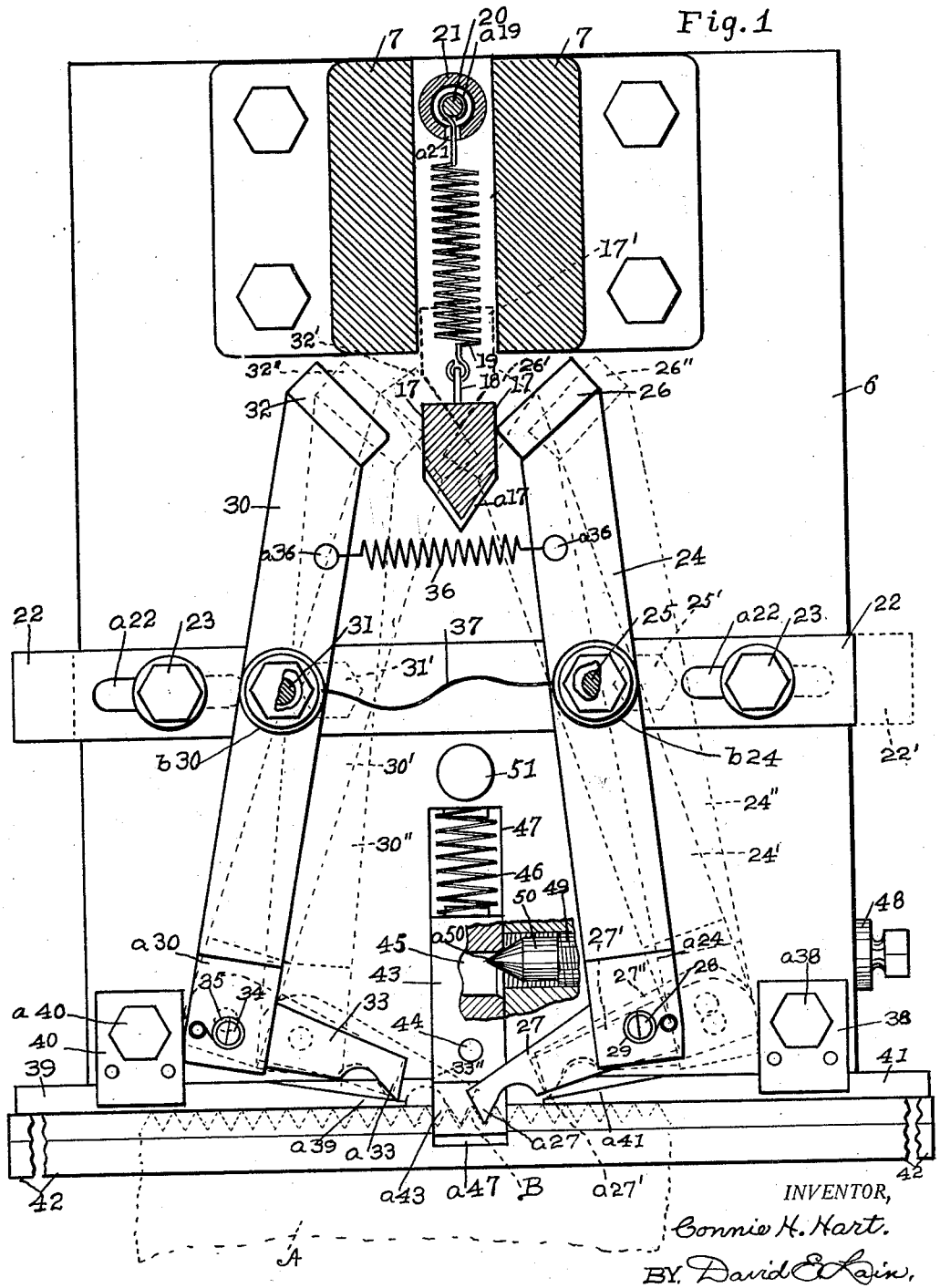

Patented May 24, 1932

1,859,363

UNITED STATES PATENT OFFICE

CONNIE H. HART, OF BELLINGHAM, WASHINGTON

SAW SETTING MACHINE

Application filed January 30, 1931. Serial No. 512,288.

My invention relates to improvements in saw sets and has for an object to provide a manually-operable, saw-setting machine which will feed a saw therethrough tooth by tooth and set the same tooth by tooth with a hammer blow in exact uniformity.

Another object of my improvement is to provide said machine made suitable for different sizes of saw teeth by simple positive adjustments.

Another object of my improvement is to provide said machine made suitable for simple adjustments to localize the hammer blow thereof.

Other objects of my improvement will appear as the description proceeds.

I attain these and other objects of my improvement with the mechanism illustrated in the two sheets of drawings accompanying this specification and forming a part thereof in which Figure 1 is a plan view of my machine in section on the bent line 1—1 of Fig. 2, Fig. 2 is a side elevation of my machine, Fig. 3 is a partial section of my machine on line 3—3 of Fig. 2, Fig. 4 is a side elevation of the anvil in my machine shown by itself, and Fig. 5 is an elevation view of the hammer peen bar shown by itself.

Similar characters refer to similar parts in the several views. Certain parts are broken away to show other parts hidden thereby.

With more particular reference to the designated parts: The machine base plate 6 has legs $a6$ to support the same. A pair of bearing brackets 7, 7 are bolted to the rear part of the base disposed parallel with each other and separated to provide a space therebetween.

Cam shaft 8 is mounted for revolution in bearings at the top of brackets 7 and is fastened to cam 9 to cause the same to revolve therewith between brackets 7, 7. The front end of cam shaft 8 is extended and on it is fastened handle 10 by which to revolve the cam. The extended part of cam 9 is shown at $a9$.

Beneath the cam in bearings in brackets 7 is mounted for revolution, hammer-handle shaft 11 which is disposed within its bearings and has an adjustment cap screw 12, 12 engaged in each end thereof to set and retain the shaft in desired longitudinal positions in its bearings. Hammer handle 13 is rigidly mounted on shaft 11, to oscillate therewith, and has an upturned rear extension 14 with an arcuate end $a14$ to contact with cam 9. Hammer 15 is an integral part of the front end of the hammer handle and has a longitudinal opening therein in which is fastened peen bar 16 having peen $a16$ on the lower end thereof. Arm 17 extends downward from the lower side of the hammer handle and has parallel sides at the rear and a wedge-shape front edge $a17$. Screw eye 18 is engaged in the rear edge of arm 17 and has the forward eye of coil spring 19 engaged therewith. The rear eye $a19$ of said spring is mounted on screw 20 to be raised and lowered thereby as said screw is revolved in housing 21 by turning screw cap $a20$. Housing 21 has slot $a21$ in the front thereof to allow the shank of spring eye $a19$ to pass therethrough as it is moved up and down by revolving screw 20.

In a transverse slot and guideway in base plate 6 is mounted fulcrum bar 22 for reciprocation. Slots $a22$, $a22$ in said bar provide for the extension therethrough of cap screws 23, 23 which are engaged in tapped holes in the bottom of the guideway and are used to clamp the fulcrum bar in desired locations. Lever 24 is fulcrumed on bar 22 by cap screw 25 which is extended through a hole through boss $b24$ thereon and engaged in a tapped hole in said fulcrum bar. The front end of lever 24 is recessed beneath and stepped upward at $a24$ to provide a housing for pawl 27. On the rear end of lever 24 is lug 26 inclined at an angle to bear flatwise on wedge surface $a17$ of handle arm 17 when lever 24 is in its dotted position at 24' and arm 17 is in its dotted position at 17'. Pawl 27 has stud 28 near one end thereof and pawl bit $a27$ on the other end thereof. Said pawl stud 28 is mounted for oscillation in a hole through the stepped end of lever 24 to dispose said pawl in the housing $a24$ beneath said stepped end. One end of a coil spring 29 is fastened in a slot in the top of stud 28; said spring is mounted over said stud and the other end thereof is fastened around a post on the lever to cause the reaction of spring 29 to tend to force pawl bit $a27$ forward.

Lever 30 is fulcrumed on fulcrum bar 22 by cap screw 31 which is extended through a hole in boss $b30$ on the lever and engaged in a tapped hole in the fulcrum bar. The front end of lever 30 is stepped up at $a30$ to provide a housing for pawl 33 which has stud 34 on one end thereof. Stud 34 is mounted for oscillation in a hole through the stepped end of the lever to dispose pawl 33 in the housing recess beneath the same. One end of coil spring 35 is fastened in a slot in the top of stud 34 and the other end thereof is fastened around a post in the top of the stepped end $a30$ of lever 30. Spring 35 reacts to cause the free end $a33$ of pawl 33 to tend to move forward. Lug 32 on the rear end of lever 30 is inclined to cause the same to lie flatwise on the wedge surface of hammer handle arm 17 when the same is in its dotted position at 17' and when lever 30 is in its dotted position at 30'. Posts $a36$, $a36$ are disposed on levers 24 and 30 between the fulcrums and the rear ends thereof and to them are fastened the ends of coil spring 36 which is made tense between said posts to cause the reaction of the spring to draw the rear ends of levers 24 and 30 toward each other when either lever is free to turn on its fulcrum. Flat strut spring 37 has its ends engaged in slots in the opposite edges of levers 24 and 30 adjacent the fulcrums thereof and reacts to maintain the opposite fulcrum-bearing surfaces of said levers in contact with their fulcrums, screws 25 and 31, at all times.

Table bar 42 is fastened to the front edge of base plate 6 with its upper surface in the plane of the upper surface of the base plate. Base plate 6 has a notch in its front top edge in which are mounted selector bars 39 and 41 to bear in said notch and also on the rear edge of table bar 42. The selector bars are clamped in desired positions in the groove formed between the base and table bar by clamping blocks 38 and 40 which are retained by cap screws $a38$ and $a40$, respectively, engaged in the base. Blocks 38 and 40 are disposed symmetrically on the base equidistant from the center of the front thereof to serve also as stops to limit the outward movements of the front ends of levers 24 and 30. Selector bar 39 has tapered end $a39$ on which bears the bit $a33$ of pawl 33 as it reciprocates, and selector bar 41 has tapered end $a41$ on which bears bit $a27$ of pawl 27 as it reciprocates.

Anvil 43 is mounted for reciprocation in groove 47, $a47$ in plate 6 and table bar 42 and is clampable in desired positions in the groove by hand screw 53 engaged in a tapped hole 44 and which enters through slot 52 in the base plate. Screw 53 has head 54 thereon which together with a washer covers slot 52 to provide a bearing for the screw when used in clamping. Handle 55 in the screw head provides finger hold to turn the screw. The anvil has an inclined face, shown at $a43$ in Fig. 4, to determine the angularity of the set made in the saw teeth as one by one they are passed over this part of the anvil. Table bar 42 has a similar inclination, shown at $a42$ in Fig. 2, to provide clearance for the teeth after they have been set. Anvil 43 has an opening in its side at 45 the use for which will be referred to. Spring 46 is installed in slot 47 to react between the base 6 and the rear end of anvil 43 to force the anvil forward in the slot. Adjusting bolt 48 is extended through an opening in plate 6 from the right-hand side thereof to anvil slot 47 and has a threaded body 49 and a conical pilot end 50, $a50$, and is disposed to cause conical end $a50$ thereof to enter and bear against the rear wall of opening 45 in the anvil. Threaded body 49 engages in the threaded inner end of said base opening and as bolt 48 is revolved forward cone $a50$ enters further in hole 45 and anvil 43 is driven thereby against the reaction of spring 46 toward the back of the base. By turning bolt 48 backward cone $a50$ is withdrawn from hole 45 and spring 46 forces the anvil forward in the base slot. These longitudinal movements of the anvil can occur only when clamping screw 53 thereof is out of clamping position.

Post 51 is centrally placed on base 6 beneath hammer handle 13 and is of a height for said handle to bear thereon and have the further downward movement of peen bar 16 stop when peen $a16$ thereof is closely adjacent inclined face $a43$ of the anvil and before contact with the same has been attained.

A fragmentary portion of a saw blade is shown in dotted outline at A and tooth B thereof is centrally disposed on the anvil as shown in Fig. 1.

In operation: As illustrated in full lines in Fig. 2, end $a9$ of cam 9 is in contact with end $a14$ of the rear extension 14 of the hammer handle 13 causing hammer head 15 and peen $a16$ to be in the most elevated positions to which they may attain. Arm 17 of the hammer handle is in its most forward position retaining lever 24 in its most advanced operative position with bit $a27$ of pawl 27 in its most advanced position toward the left bearing against saw tooth B which is centrally disposed on anvil 43 on the spot to receive a blow from hammer peen $a16$ when the same descends, as shown in Fig. 1. But the cam tip is very close to the edge of arcuate handle end $a14$ and the forward turning of crank handle 10 a few degrees will cause the cam to pass from contact therewith allowing handle end 14, $a14$ to move forward to their dotted-outline positions at 14′, a14′ with handle end a14 bearing on the inner part of the cam at b9. At the same time hammer handle 13, hammer head 15 and peen bar 16 have moved to their lowest positions, indicated in dotted outline and marked with the primes of said designating characters, with hammer peen a16 bearing on saw tooth B which was struck a blow thereby. By construction the hammer structure is overbalanced in weight forward of fulcrum shaft 11 and this together with the reaction of spring 19 caused the blow on tooth B struck by the hammer to be sufficient for the purpose desired, that is, to cause the tooth to, not only be bent to the shape of the anvil face on which it lies, but also to be set to remain in said shape.

When setting saw teeth with the ordinary saw setting device they are forced over into the position beyond which it is desired they shall retain because they will spring back by the resiliency of the metal to occupy a less angular position. There is, therefore, some uncertainty as to the exact position assumed by saw teeth set by said usual setting device, and also there is danger of breaking the teeth when they are thus forced over to the extreme position required simply by pressure. But with the hammer blow delivered through peen a16, which conforms to the shape of the anvil face, the tooth is bent into the desired angularity while the metal thereof is vigorously agitated and flows into the new shape thus causing the set of the tooth to exactly conform to the anvil shape resulting in uniformity of the set of the several teeth of the saw.

During the time the hammer was descending arm 17 thereon moved rearward from its position shown in section at 17 in Fig. 1 to its position shown in dotted outline at 17′ in Fig. 1 and also shown in elevation in Fig. 2. In Fig. 1 lever 30 is shown in full lines with its front end bearing on block 40 and its fulcrum screw 31 engaged in slide 22 which is clamped to the base 6 by screws 23. Therefore lever 30 is retained in a stationary position during its period of being out of action and spring 36 connected therewith is now fastened to a stationary part of the mechanism. Said spring is also connected with the rear end of lever 24 and reacts to cause lug 26 thereon to move to its dotted position shown in dotted lines at 26′ as rapidly as arm 17 moves rearward to allow the same. The left-hand movement of the rear end of lever 24 causes a corresponding right-hand movement of the front end thereof and pawl 27 is withdrawn to its dotted position at 27′ with its bit at a27′ on selection bar 41 by the time the hammer peen delivers its blow on the saw tooth.

It is assumed that the revolution of hand crank 10 is continuous during the setting of one side of the saw so that cam 9 continues forward revolutions and the increasing diameter of the cam surface passing by arcuate end a14 of the rear hammer handle end forces the same backward causing arm 17 to swing forward and the inclined surface of the front part a17 thereof forces lug 26 toward the right and the front end with pawl 27 thereon toward the left and bit a27 drops over the tapered end of selection bar 41 and engages with the second tooth to the right from said tooth B, said selection bar having been set in the proper position to lead the bit to said engagement under the reaction of spring 29. The continued movement of the inclined surface a17 forward causes pawl 27 to feed the saw blade A toward the left till the tooth against which bit a27 is pressing is carried to a central position on the anvil at the spot to be struck by the next hammer blow when arm 17 has reached a point in its forward swing where the inclined surface thereof joins the side wall thereof which then bears on lug 26 and the outward swing of the lug ceases as also does the left-hand movement of pawl 27 and the said saw tooth is allowed to remain properly spotted on the anvil for the next hammer blow which again is released by the passing of cam end a9 beyond hammer arm end a14 and the hammer descends as before while pawl 27 is withdrawn and peen a16 contacts with the saw tooth spotted on the anvil providing the desired set therein. Thus the action continues till every other tooth on the saw has been set, when the saw is turned over end for end and the first tooth at the then right-hand end thereof is placed where bit a33 of pawl 33 may engage therewith. Meanwhile clamp screws 23, 23 have been loosened and slidable fulcrum bar 22 has been set in its dotted position at 22′ causing lever 24 to occupy its fixed position at 24″ and lever 30 to occupy its operative position at 30′.

Then the revolution of crank 10 continues as before and the unset alternating teeth of the saw one at a time are spotted on anvil face a43 by oscillating pawl 33 each in turn to be given a blow by hammer peen a16 while thus spotted till all of the teeth of the saw have been set to uniformity.

When it is desired to decrease the amount of set given the teeth, screw 54 is loosened by turning handle 55 thereon and screw bolt 48 is turned forward to cause conical pilot a50 to enter further in hole 45 and force the anvil rearward against the reaction of spring 46 by which less of the inclined face of the anvil is disposed beneath the saw. To increase the set given the teeth bolt 48 is turned backward withdrawing the conical pilot from the hole in the anvil which allows the anvil to be moved forward by the spring and disposes more of the said inclined anvil face beneath the saw. It has been found desirable in practice to clamp the anvil in its slot during use principally to prevent the entry of particles of filings between the same and the bottom of the slot on which it bears.

The teeth of saws which this machine is more especially suited for setting vary in size requiring different ranges in oscillation of pawls 27 and 33 in order that two of the teeth may be fed over the anvil during each pawl movement.

There are several adjustments which together attain this end. The distance of the fulcrums of levers 24 and 30 from the center line through arm 17 and the anvil affects the length of movement of pawls 27 and 33. The disposition of pivot fulcrum screws 25 and 31 is controlled by the location of fulcrum bar 22 in its slideway which is easily adjusted as explained. The stability of the fulcrum axes of said levers is assured by strut spring 37 relative to the fulcrum bar because this spring maintains the bearings of the levers on opposite sides of screws 25 and 31. The longitudinal adjustment of the disposition of hammer handle shaft 11 in brackets 7, 7 is made by cap screws 12, 12 in the ends thereof, as explained, whereby the lateral disposition of the blows from hammer peen $a16$ is determined. And the distance of the ends of selection bars 39 and 41 from anvil 43 is adjusted by setting these bars, as explained, to cause the bits of the pawls to engage with the desired saw tooth as they drop over the ends of said bars. By these several simple adjustments the delivery of the blows from the hammer peen centrally on each tooth while it is spotted on the anvil can be attained.

Having thus disclosed my invention, what I claim as new therein and desire to secure by Letters Patent is,—

1. A saw setting machine including a base, a bearing bracket fastened to the base, a hammer handle mounted in a bearing on the bracket for oscillation in a vertical plane, means to adjust the position of the hammer handle longitudinally of its axis of oscillation, a hammer having a peen thereon fastened on the front end of the hammer handle, a cam mounted for revolution in a bearing on the bracket disposed to bear on the rear end of the hammer handle to raise and drop the hammer during each revolution thereof, means to revolve the cam, an arm fastened to the hammer handle extended downward therefrom proximate to the base to oscillate with said hammer handle, two levers fulcrumed on a fulcrum bar each with a rear end adapted to bear on the handle arm for oscillation thereby, a tension spring connected to both levers rearward of their fulcrums to react to cause the front ends thereof to bear against stops, said stops fastened to the base to limit the oscillation of the levers, said fulcrum bar mounted for reciprocation on the base parallel with the said axis of oscillation of the hammer handle having said lever fulcrums disposed thereon to cause the rear ends of the levers to bear one at a time on the handle arm for reciprocation thereby by the reciprocation of the fulcrum bar, means to releasably fasten the fulcrum bar to the base, an anvil fastened on the base beneath the hammer peen centrally disposed between the stop blocks, and a pawl pivoted on the front end of each of the levers disposed to engage with a tooth of a saw to move and spot the same on the anvil beneath the hammer peen when said lever end oscillates.

2. A saw setting machine including a base, bearing brackets on the base, a hammer handle mounted for oscillation in a vertical plane in bearings on the brackets, a hammer having a peen thereon fastened on the front end of the hammer handle, an arm fastened to the hammer handle adjacent the axis of oscillation thereof to oscillate therewith, a cam mounted for revolution in bearings on the brackets to bear on the rear end of the hammer handle to raise and drop the hammer and oscillate the arm during each revolution thereof, means to revolve the cam, two levers fulcrumed on the base their rear ends disposed adjacent the arm, means to cause said levers one at a time to bear on the arm to be oscillated thereby, a spring-pressed pawl pivoted to the front end of each lever to engage a tooth of a saw to move and spot the same on an anvil during each oscillation of the lever, said anvil having an inclined-plane face thereon centrally disposed between the front ends of the levers, and means to move and retain the anvil to spot different parts of said inclined face thereof beneath said saw tooth and in the path of oscillation of the hammer peen.

3. A saw setting machine including a base, bearing brackets on the base, a hammer handle mounted for oscillation on the brackets on a horizontal axis, a hammer having a peen thereon fastened on the front end of the hammer handle, an arm fastened to the handle adjacent said axis thereof to oscillate therewith, a cam mounted for revolution in bearings on the brackets to bear on the rear end of the hammer handle to raise and drop the hammer and oscillate the arm during each revolution thereof, means to revolve the cam, two levers fulcrumed on the base their rear ends disposed adjacent the arm, means to cause the rear ends of the levers one at a time to bear on the arm to be oscillated thereby, two selective bars disposed longitudinally in line adjacent and in front of the front ends of the levers providing a space between the opposite ends thereof, means to retain and to move the selective bars longitudinally to vary the space therebetween, a spring-pressed pawl pivoted to the front end of each lever to bear on the rear edge of one of the selective bars and to pass over the said opposite end thereof to engage and move the tooth of a saw disposed against the front edge of the said selective bars and spot the same on an anvil during each oscillation of the lever, said anvil having an inclined plane face thereon centrally disposed between the front ends of the levers on the base, and means to move the anvil forward and backward on the base and to retain the same to spot different parts of the said inclined face thereof beneath said saw tooth and in the path of the oscillations of said hammer peen.

CONNIE H. HART.